United States Patent
Hanevich et al.

(10) Patent No.: US 8,805,297 B2
(45) Date of Patent: Aug. 12, 2014

(54) BAND STITCHING ELECTRONIC CIRCUITS AND TECHNIQUES

(71) Applicant: Raytheon Company, Waltham, MA (US)

(72) Inventors: Daniel A. Hanevich, Camarillo, CA (US); Douglas E. Fullmer, Buelton, CA (US); Lee M. Savage, Santa Barbara, CA (US); Steven L. Kaufman, Port Hueneme, CA (US); Jack E. White, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 126 days.

(21) Appl. No.: 13/659,239

(22) Filed: Oct. 24, 2012

(65) Prior Publication Data
US 2014/0105256 A1 Apr. 17, 2014

Related U.S. Application Data

(60) Provisional application No. 61/714,398, filed on Oct. 16, 2012.

(51) Int. Cl.
*H04B 1/38* (2006.01)
(52) U.S. Cl.
USPC .......................................... 455/73; 375/219
(58) Field of Classification Search
CPC ....................................................... H04B 1/40
USPC ............. 455/73, 552.1, 553.1, 334, 313, 323, 455/339; 375/267
See application file for complete search history.

(56) References Cited

U.S. PATENT DOCUMENTS

| | | |
|---|---|---|
| 5,109,188 A | 4/1992 | Sanderson et al. |
| 6,031,485 A | 2/2000 | Cellai et al. |
| 6,031,869 A | 2/2000 | Priebe et al. |
| 6,085,077 A | 7/2000 | Fields et al. |
| 6,091,362 A | 7/2000 | Stilp et al. |
| 6,097,336 A | 8/2000 | Stilp |

(Continued)

FOREIGN PATENT DOCUMENTS

| | | |
|---|---|---|
| EP | 2 403 145 A1 | 1/2012 |
| WO | WO 03/100981 A1 | 12/2003 |
| WO | WO 2009 036981 | 3/2009 |
| WO | WOX 2009/036981 A1 | 3/2009 |

OTHER PUBLICATIONS

Dai et al.; "Application of Uniform DFT Filter Bank in Radar Jamming System;" Journal of Systems, Engineering and Electronics, vol. 17, No. 3; Sep. 1, 2006; pp. 527-600.

(Continued)

*Primary Examiner* — Lewis West
(74) *Attorney, Agent, or Firm* — Daly, Crowley, Mofford & Durkee, LLP

(57) ABSTRACT

An electronic circuit combines two or more individual wideband RF receivers or transceiver band circuits to produce a usable instantaneous bandwidth that is wider than the bandwidth of the individual band circuits. The electronic circuit overcomes the difficulties of combining bands to provide low signal distortion across the band edges and throughout the combined instantaneous bandwidth of the two or more individual band circuits. This electronic circuit utilizes an amplitude, time delay, and phase adjustment procedure that uses associated adjustable circuitry to eliminate misalignments between the two or more individual band circuits.

31 Claims, 8 Drawing Sheets

(56) References Cited

U.S. PATENT DOCUMENTS

| | | | |
|---|---|---|---|
| 6,115,599 A | 9/2000 | Stilp | |
| 6,172,644 B1 | 1/2001 | Stilp | |
| 6,184,829 B1 | 2/2001 | Stilp | |
| 6,266,013 B1 | 7/2001 | Stilp et al. | |
| 6,281,834 B1 | 8/2001 | Stilp | |
| 6,285,321 B1 | 9/2001 | Stilp et al. | |
| 6,313,781 B1 | 11/2001 | Lee | |
| 6,317,081 B1 | 11/2001 | Stilp | |
| 6,317,604 B1 | 11/2001 | Kovach, Jr. et al. | |
| 6,334,059 B1 | 12/2001 | Stilp et al. | |
| 6,351,235 B1 | 2/2002 | Stilp | |
| 6,388,618 B1 | 5/2002 | Stilp et al. | |
| 6,400,320 B1 | 6/2002 | Stilp et al. | |
| 6,448,921 B1 | 9/2002 | Tsui et al. | |
| 6,463,290 B1 | 10/2002 | Stilp et al. | |
| 6,473,474 B1 | 10/2002 | Wiegand | |
| 6,483,460 B2 | 11/2002 | Stilp et al. | |
| 6,492,944 B1 | 12/2002 | Stilp | |
| 6,519,465 B2 | 2/2003 | Stilp et al. | |
| 6,563,460 B2 | 5/2003 | Stilp et al. | |
| 6,603,428 B2 | 8/2003 | Stilp | |
| 6,646,604 B2 | 11/2003 | Anderson | |
| 6,661,379 B2 | 12/2003 | Stilp et al. | |
| 6,765,531 B2 | 7/2004 | Anderson | |
| 6,792,057 B2 | 9/2004 | Kabel et al. | |
| 6,873,290 B2 | 3/2005 | Anderson et al. | |
| 7,023,383 B2 | 4/2006 | Stilp et al. | |
| 7,035,311 B2 | 4/2006 | Nohara et al. | |
| 7,062,001 B2 | 6/2006 | Lee | |
| 7,271,765 B2 | 9/2007 | Stilp et al. | |
| 7,430,254 B1 | 9/2008 | Anderson | |
| 7,436,910 B2 | 10/2008 | Fudge et al. | |
| 7,436,911 B2 | 10/2008 | Fudge et al. | |
| 7,436,912 B2 | 10/2008 | Fudge et al. | |
| 7,489,745 B2 | 2/2009 | Fudge | |
| 7,542,812 B2 | 6/2009 | Stroili et al. | |
| 7,728,782 B2 | 6/2010 | Watson et al. | |
| 7,916,303 B2 | 3/2011 | Ronnekleiv et al. | |
| RE42,285 E | 4/2011 | Anderson et al. | |
| 8,045,654 B1 | 10/2011 | Anderson | |
| 2012/0269252 A1* | 10/2012 | Ward | 375/228 |

OTHER PUBLICATIONS

Eshraghi et al,; "A Comparative Analysis of Parallel Delta-Sigma ADC Architectures;" IEEE Transactions on Circuits and Systems 1: Regular Papers, vol. 51, No. 3; Mar. 2004; 9 pages.

Eshraghi et al.; "A Comparison of Three Parallel ΔΣ A/D Converters;" IEEE International Symposium on Circuits and Systems; May 12-15, 1996; pp. 517-520.

Hill et al,; "Statistical Processing Techniques for Detecting DRFM Repeat-Jam Radar Signals;" IEE Colloquium on Signal Processing Techniques for Electronic Warfare; Jan. 31, 1992; 6 pages.

Kong at al.; "Frequency Domain Analysis of ΠΔΣ and Its Application to Combining Subband Decomposition and ΠΔΣ ADC;" IEEE 39$^{th}$ Midwest Symposium on Ames Circuits and Systems; Aug. 1996; pp. 226-229.

PCT Search Report and Written Opinion of the ISA dated Nov. 25, 2013; for PCT Pat. App. No. PCT/US2013/052012; 15 pages.

Das; "Hittite's Vector Modulators;" Hittite Microwave Corporation; V00.0608; Product Application Note; http://www.hittite.com/content/documents/application_notes/Vector%20Modulators.pdf; Jan. 1, 2008; 8 pages.

* cited by examiner

BAND STITCHING ELECTRONIC CIRCUITS AND TECHNIQUES

CROSS REFERENCE TO RELATED APPLICATIONS

This application claims the benefit of U.S. Provisional Application No. 61/714,398, filed on Oct. 16, 2012 under 35 U.S.C. §119(e), which application is hereby incorporated herein by reference in its entirety.

FIELD OF THE INVENTION

This invention relates generally to electronic receivers and transceivers, and, more particularly, to electronic receivers and transceivers that have a plurality of separate band circuits, each operating in separate frequency bands, signals from which are combined together into one contiguous frequency band.

BACKGROUND OF THE INVENTION

Radio frequency receivers and transceivers are known, including receivers and transceivers that use analog circuits, and receivers and transceivers that use both analog and digital circuits.

Some electronic components used in receivers and transceivers present speed limitations that influence circuit architecture. For example, analog-to-digital converters (ADCs) used in receivers and transceivers can have speed limitations that make it impractical or impossible to convert analog signals to digital signals fast enough to allow operation over a sufficiently wide frequency band for all applications. One such application is in electronic warfare (EW) receivers and transceivers, for which operation is desirable over a very wide frequency range, for example, three Gigahertz (GHz) or more. In order to achieve a frequency range (i.e., a frequency band) of three GHz, an ADC must sample at a rate of somewhat more than six GHz, which ADC is presently not available if the ADC simultaneously needs to have high dynamic range and/or small size and weight.

When a desired bandwidth exceeds the capability of existing electronic components, one approach uses a circuit architecture that provides and operates in separate bands, each having a narrower bandwidth, and then "stitching" the bands together to form one contiguous frequency band having a wider bandwidth.

Stitching of bands presents particular problems for many receivers and transceivers. In particular, separate electronic circuits (i.e., separate band circuits) used to provide the plurality of bands have different characteristics, even if the separate electronic circuits are seemingly identical. For example, particularly at radio frequencies, the separate electronic circuits can generate substantially different amplitudes, substantially different group delays, and substantially different phases. The different characteristics result in undesirable signal distortions upon band stitching, particularly near the intersection of two frequency bands. The distortions can be highly problematic, particularly when a signal, either a narrowband signal or a wideband signal, has one or more frequency components that are at or near the intersection of two adjacent frequency bands.

It would be highly desirable to provide a circuit and technique for which frequency bands of separate electronic band circuits can be stitched together, but for which signal distortions due to band stitching are greatly reduced.

SUMMARY OF THE INVENTION

The present invention provides circuits and techniques for which frequency bands of separate electronics band circuits can be stitched together, and for which signal distortions due to band stitching are greatly reduced.

In accordance with one aspect of the present invention, an electronic circuit for receiving and processing a signal includes a first band circuit. The first band circuit includes a first down converter configured to receive a signal representative of the received signal and configured to generate a first down converted signal. The first band circuit also includes a first antialias filter coupled to receive a signal representative of the first down converted signal and configured to generate a first antialiased signal, the first antialias filter having a first upper corner frequency and a first lower corner frequency, a span between which is indicative of a first frequency band. The first band circuit also includes a digital low pass filter coupled to receive a signal representative of the first antialiased signal and configured to generate a low pass filtered signal within the first frequency band. The electronic circuit further includes a second band circuit. The second band circuit includes a second down converter configured to receive a signal representative of the received signal and configured to generate a second down converted signal. The second band circuit further includes a second antialias filter coupled to receive a signal representative of the second down converted signal and configured to generate a second antialiased signal, the second antialias filter having a second upper corner frequency and a second lower corner frequency, a span between which is indicative of a second different frequency band. The second band circuit further includes a digital high pass filter coupled to receive a signal representative of the second antialiased signal and configured to generate a high pass filtered signal within the second frequency band. The digital low pass filter comprises a first corner frequency proximate to the first upper corner frequency of the first antialias filter, and the digital high pass filter comprises a second corner frequency proximate to the second lower corner frequency of the second antialias filter. At least one of the first band circuit or the second band circuit further comprises an up converter coupled to receive a signal representative of the low pass filtered signal or a signal representative of the high pass filtered signal, respectively. The up converter is configured to generate an up converted signal. The electronic circuit further includes a combiner configured to combine a signal within a frequency band representative of the first frequency band with a signal within a frequency band representative of the second frequency band to generate a combined signal within a wider combined frequency band wider than the first frequency band and wider than the second frequency band. The wider combined frequency band has a band stitching region in which the first and second frequency bands overlap or abut. The digital low pass filter and the digital high pass filter have substantially complimentary amplitude and phase responses selected to result in the wider combined frequency band having reduced phase response fluctuations and reduced amplitude response fluctuations in the band stitching region.

In accordance with another aspect of the present invention, a method is used in an electronic circuit used for receiving and processing a signal. The method includes, in a first band circuit, down converting a signal representative of the received signal to generate a first down converted signal. The method further includes, in the first band circuit, filtering a signal representative of the first down converted signal with a first antialias filter to generate a first antialiased signal, the first antialias filter having a first upper corner frequency and a first lower corner frequency, a span between which is indicative of a first frequency band. The method further includes, in the first band circuit, low pass filtering, with a digital low pass filter, a signal representative of the first antialiased signal to generate a low pass filtered signal within the first frequency band. The method further includes, in a second band circuit, down converting a signal representative of the received signal to generate a second down converted signal. The method further includes, in the second band circuit, filtering a signal representative of the second down converted signal with a second antialias filter to generate a second antialiased signal, the second antialias filter having a second upper corner frequency and a second lower corner frequency, a span between which is indicative of a second different frequency band. The method further includes, in the second band circuit, high pass filtering, with a digital high pass filter, a signal representative of the second antialiased signal to generate a high pass filtered signal within the second frequency band. The digital low pass filter comprises a first corner frequency proximate to the first upper corner frequency of the first antialias filter. The digital high pass filter comprises a second corner frequency proximate to the second lower corner frequency of the second antialias filter. The method further includes frequency shifting to a higher frequency at least one of the first frequency band or the second frequency band. The method further includes combining a signal within a frequency band representative of the first frequency band with a signal within a frequency band representative of the second frequency band to generate a combined signal within a wider combined frequency band wider than the first frequency band and wider than the second frequency band. The wider combined frequency band has a band stitching region in which the first and second frequency bands overlap or abut. The digital low pass filter and the digital high pass filter have substantially complimentary amplitude and phase responses selected to result in the wider combined frequency band having reduced phase response fluctuations and reduced amplitude response fluctuations in the band stitching region.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the present invention, some introductory concepts and terminology are explained. As used herein, the term "band circuit" is used to describe one of a plurality of band circuits used together in a common electronic circuit, each of which operates upon the same received radio frequency (RF) signal, but which operate in different frequency bands, i.e., upon different frequency band portions of the received radio frequency signal. The received radio frequency signal can have frequency components that can span, from time to time, or at the same time, frequencies within or throughout more than one of the frequency bands of the individual band circuits. Thus, simply stated, if an input signal has a frequency band of possible frequencies three GHz wide (e.g., centered at about 21 GHz), one band circuit can operate on the lowest one GHz of the input signal, a second band circuit can operate on the middle one GHz of the input signal, and a third band circuit can operate on the highest one GHz of the input signal. Frequency bands of the band circuits can be adjacent, forming, once stitched together, a larger contiguous frequency band upon which the common electronic circuit operates.

In contrast, as used herein, the term "channels" is used to describe a narrower frequency partitioning, narrower than a band, which can be performed by individual ones of the band circuits or by a receiver function described below in conjunction with FIG. 2.

As used herein, the term "complementary" when referring, for example, to amplitude and phase responses of two electronic filters, is used to mean that the amplitude and phase responses of the two electronic filters are designed such that they produce a nearly flat amplitude and group delay response when summed together. This facilitates the goal of band stitching (i.e., combining) signals from two associated band circuits with minimal distortion. In general, this goal is easiest to achieve using a digital low pass filter and a digital high pass filter with equal group delay responses.

As used herein, the term "signal" is used to describe an electronic current or voltage (or electromagnetic wave) that changes with time. The signal can be a broadband signal spanning a plurality of frequencies or a narrowband signal spanning one or a small number of frequencies. The signal can be continuous in time of can occur from time to time. The signal can have frequency components from low frequencies, for example, 100 Hertz, to very high frequencies, for example 200 Gigahertz.

While examples are given below of radio frequency circuits and techniques, it should be appreciated that similar circuits and techniques can be used at any frequencies, both higher and lower, with similar advantageous results.

Figure 1:
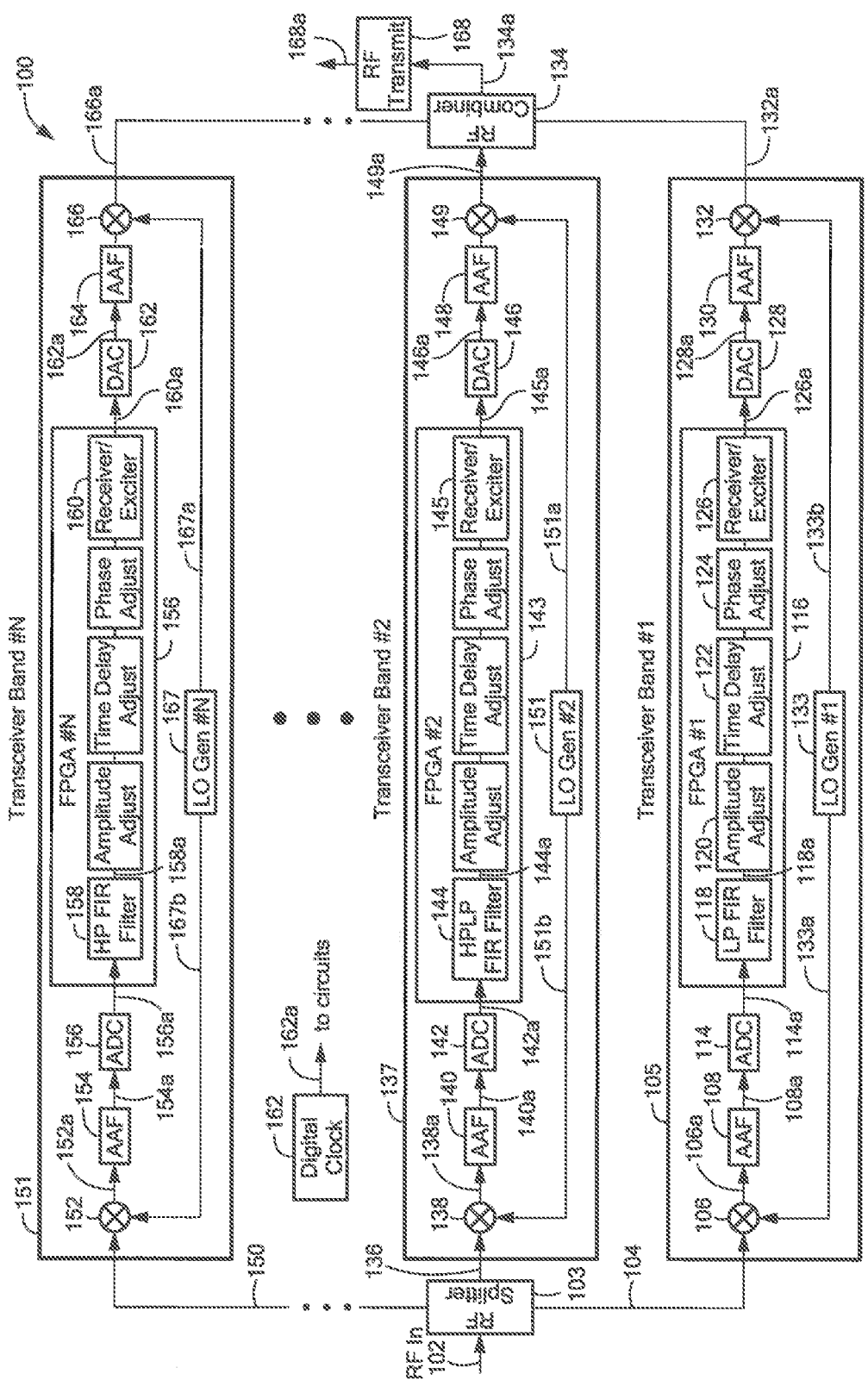
FIG. 1 is a block diagram showing a multi-band transceiver for which signals from separate band circuits are stitched together, one band circuit having a digital low pass filter and an adjacent band circuit having a digital high pass filter.

Referring to FIG. 1, an exemplary electronic circuit 100 includes a plurality of band circuits 105, 137, 151. A first band circuit 105 is described in detail below and, except for differences described below, can be the same as or similar to other ones of the band circuits 137, 151.

The electronic circuit 100 provides a transceiver function. A receiver-only function is described below in conjunction with FIG. 2.

An exemplary radio frequency circuit 100 for receiving and processing an RF signal 102 includes a first band circuit 105. The first band circuit 105 includes a first down converter 106 configured to receive a signal 104 representative of the received RF signal 102 and configured to generate a first down converted signal 106a. The first band circuit 105 also includes a first antialias filter 108 coupled to receive a signal 106a representative of the first down converted signal 106a and configured to generate a first antialiased signal 108a. The first antialias filter 108 has a first upper corner frequency and a first lower corner frequency, a span between which is indicative of a first frequency band. The first band channel 105 also includes a digital low pass filter 118 coupled to receive a signal 114a representative of the first antialiased signal 108a and configured to generate a low pass filtered signal 118a within the first frequency band.

The exemplary radio frequency circuit 100 also includes a second band circuit 137. The second band circuit 137 includes a second down converter 138 configured to receive a signal 136 representative of the received RF signal 102 and configured to generate a second down converted signal 138a. The second band circuit 137 also includes a second antialias filter 140 coupled to receive a signal 138a representative of the second down converted signal 138a and configured to generate a second antialiased signal 140a. The second antialias filter 140 has a second upper corner frequency and a second lower corner frequency, a span between which is indicative of a second different frequency band. The second band circuit 137 also includes a digital high pass filter 144 coupled to receive a signal 142a representative of the second antialiased signal 140a and configured to generate a high pass filtered signal 144a within the second frequency band.

The digital low pass filter 118 has a first corner frequency proximate to the first upper corner frequency of the first antialias filter 108, and the digital high pass filter 144 has a second corner frequency proximate to the second lower corner frequency of the second antialias filter 140.

The exemplary radio frequency circuit 100 also includes a combiner 134 (e.g., an RF combiner) configured to combine a signal 132a within a frequency band representative of the first frequency band with a signal 149a within a frequency band representative of the second frequency band to generate a combined signal 134a within a wider combined frequency band. The wider combined frequency band has a band stitching region in which the first and second frequency bands overlap or abut. The band stitching frequency region is described more fully below in conjunction with FIGS. 3 and 4.

The digital low pass filter 118 and the digital high pass filter 144 have substantially complimentary phase responses selected to result in the wider combined frequency band having reduced phase response fluctuations and reduced amplitude response fluctuations in the band stitching region.

In some embodiments, an amount of overlap of the first band (associated with the first antialias filter 108) with the second band (associated with the second antialias filter 140) is selected to result in the wider combined frequency band having reduced phase response fluctuations and reduced amplitude response fluctuations in the band stitching region. In some embodiments, amount of overlap of the first corner frequency (of the digital low pass filter 118) with the second corner frequency (of the digital high pass filter 144) is also selected to result in the wider combined frequency band having reduced phase response fluctuations and reduced amplitude response fluctuations in the band stitching region.

In some embodiments, the digital low pass filter 118 and the digital high pass filter 144 are finite impulse response (FIR) digital filters.

The exemplary radio frequency circuit 100 can also include a radio frequency (RF) transmitter 168 coupled to receive the combined signal 134a, which can be an RF signal, and configured to generate an RF signal 168a that can be provided to an RF antenna (not shown).

While the above is described in conjunction with the first and second band circuits 105, 137, respectively, the same description applies to any two band circuits that have adjacent bands. To achieve this end, the digital high pass filter 144 can be part of a digital high pass filter/digital low pass filter combination 144 (i.e., a band pass filter). With this arrangement, the combined filter 144 can form a digital low pass filter that can have a phase complimentary to a phase of a digital high pass filter in a third band, of which a digital high pass filter 158 within an Nth band circuit 151 is representative. Thus, it should be appreciated that any number of band circuits can be stitched together to form a wider combined frequency band.

It should also be appreciated that, in some embodiments, the digital low pass filter 118 of the first band circuit 105 and the digital high pass filter 158 of the Nth band circuit 151 can be respective combined digital high pass filter/digital low pass filter combinations the same as or similar to the combined filter 144.

In some embodiments, the electronic circuit 100 can also include a first waveform processor (i.e., a receiver/exciter module 126) coupled to receive a signal representative of the low pass filtered signal 118a and configured to generate a first transmission signal 126a in accordance with the low pass filtered signal 118a. In some embodiments, the electronic circuit 100 can also include a second waveform processor (i.e., a receiver/exciter module 1145) coupled to receive a signal representative of the high pass filtered signal 144a and configured to generate a second transmission signal 145a in accordance with the high pass filtered signal 144a. The combiner 134 is coupled to receive a signal 132a representative of the first transmission signal 126a and a signal 149a representative of the second transmission signal 145a and configured to generate the combined signal 134a in accordance with the signals 132a, 149a.

In some embodiments, the electronic circuit 100 can also include a first up converter 132 coupled between the first waveform processor 126 and the combiner 134 to generate a first up converted signal 132a. In some embodiments, the electronic circuit 100 can also include a second up converter 149 coupled between the second waveform processor 145 and the combiner 134 to generate a second up converted signal 149a. Thus, the combiner 134 is configured to generate the combined signal 134a in accordance with the signal 132a representative of the first up converted signal 132a and the signal 149a representative of the second up converted signal 149a. It will be understood that the signals 132a, 149a can be in the same RF frequency band in which the received RF signal 102 resides.

Each band circuit 105, 137, 151 can include a local oscillator (LO) generator 133, 151, 167, respectively, coupled to the down converters 106, 138, 152, respectively, and to the up converters 132, 149, 166, respectively. In some embodiments, each one of the LO generators 133, 151, 167 generates different frequencies 133a-133b, 151a-151b, 167a-167b, respectively. Thus, in some embodiments, the different frequencies of the LO generators 133, 151, 167 can result in the down converted signals within the different band circuits 105, 137, 167, i.e. signals 106a, 138a, 152a, being in the same frequency range, and thus, the antialias filters 108, 140, 154 can be the same. However, due to the different frequencies of the LO generators 133, 151, 167, each one of the band circuits 105, 137, 151 operates on (i.e., passes through) a different portion of the frequency spectrum of the received RF signal 102. The different portions are stitched back together by operation of the up converters 132, 149, 166 and the combiner 134 to generate the original frequency spectrum (with modifications) of the received RF signal 102.

In operation, with this arrangement, the waveform processors, e.g., 126, 145, can reproduce the received RF signal 102 (but at respective down-converted (i.e., IF) frequencies), can alter the reproduced RF signal in desired ways, can up convert the reproduced RF signal, and can generate the combined signal 134a having the altered characteristics at the RF frequencies of the received RF signal 102. In one embodiment, the electronic circuit 100 forms a radar jammer for which a radar signal 102 is received and a modified radar signal 134a is transmitted in response thereto.

Also, in operation, in order to properly stitch two or more bands of the band circuits 105, 137 together, a signal passing through each band circuit should match in amplitude, time delay, and phase so that they can be properly added together, each frequency band adjacent to a next in frequency, at the combiner 134.

The digital low pass filter 118 and the digital high pass filter 144 can be designed to have substantially equal time delays, and corresponding substantially equal phase responses. It will be understood that this time delay and phase relationship can be achieved with the above-described digital low pass and digital high pass FIR filters. However, in other embodiments, the phase relationships can be other than equal, so long as the amplitude and phase responses of the electronic filters are complementary, resulting, as described above, in amplitude and phase responses of the two filters that produce a substantially flat amplitude and group delay response when summed together, and hence facilitate the goal of band stitching of two associated band circuits with minimal distortion.

It is known that digital FIR filters have a predetermined time delay, which is equivalent to a linear phase response. This characteristic is useful when attempting to generate complementary amplitude and phase responses of channels that operate upon different frequency bands. Infinite impulse response (IIR) filters (e.g., digital IIR filters) can also be used as long as the resulting high pass and low pass filter responses are complimentary and the design is done carefully.

The substantially equal time delay responses result in a well behaved group delay for signal frequencies within the above-described band stitching region in which the bands overlap or abut once stitched. Thus, the stitching of adjacent band circuits and signals within the adjacent band circuits can occur with reduced distortion, compared with circuits that do not have the digital low pass filter 118 and the digital high pass filter 144 with substantially complementary amplitude and phase responses.

It should be understood that, for circuits that operate at very high RF frequencies, for example, in a GHz range, even small differences in circuit layout, in circuit capacitance, and in circuit inductance can result in time delay mismatch and resulting phase mismatch between two seemingly identical electronic circuits, even digital circuits. Therefore, as used herein, the term "substantially" when referring, for example, to a "substantially complimentary phase response" refers to phase responses that are equal to within the tolerance limits of real electronic circuits that introduce time and phase delay errors, particularly at RF frequencies. It will be understood that a tolerance band associated with the term "substantially" depends upon the signal frequencies at which the electronic circuits operate and upon the circuit technology used to generate the associated circuits.

Taking the entire band circuits 105, 137, 151, it will be appreciated that, even for digital circuits with perfect circuit matches and otherwise perfect band stitching, other characteristics of the other electronic modules, e.g., analog circuits, within the different band circuits 105, 137, 151 can result in error, particularly within the band stitching frequency region, once the bands are stitched together. The different characteristics can include, but are not limited to, different amplitudes in adjacent band circuits, different time delays in the adjacent band circuits, and different phases in the adjacent band circuits.

In view of the above, each band circuit can include an amplitude adjustment module, e.g., 120, a time delay adjustment module, e.g., 122, and a phase adjustment module, e.g., 124. These modules can be used in a calibration mode of operation to adjust amplitudes, phases, and time delays among the band circuits. Calibration is described more fully below in conjunction with FIG. 6.

Each one of the band circuits can also include an analog-to-digital converter, e.g., 114, coupled to receive the signal 108a from an anti-alias filter, e.g., 108, and a digital to analog converter, e.g., 128, coupled to receive a processed signal, e.g., 126a, from a waveform processor, e.g., 126.

The digital low pass filter 118, the amplitude adjustment module 120, the time delay adjustment module 122, the phase adjustment module 124, and the waveform processor 126 are shown to be coupled in series within a digital field programmable gate array (FPGA). However, in other embodiments the identified elements can be within another form of digital integrated circuit, for example, a as a digital signal processor (DSP) or as a custom integrated circuit. In still other embodiments, one or more of the amplitude adjustment module 120, the time delay adjustment module 122, or the phase adjustment module 124 can be disposed at different positions within the band circuit 105. For example, in other embodiments, amplitude adjustments, time delay adjustments, or phase adjustments can be made in the analog domain to the RF input signal 104, or to the RF output signal 132a, or at any other similar locations in the RF signal path. In still other embodiments, the amplitude adjustments, the time delay adjustments, or the phase adjustments can be made in the analog domain to the signal 108a, to the analog-to-digital converter signal 114a, or to signal 128a from the digital-to-analog converter 128. Essentially, the amplitude adjustments, the time delay adjustments, and/or the phase adjustments can be made any place in the signal chain of each band circuit.

It should be understood that the antialias filters, e.g., 108, 140, by themselves are not well suited to generate the responses needed to sum (i.e., combine) signals from adjacent band circuits. It is quite difficult to design analog bandpass filters, especially rapid rolloff antialias filters, to have the sufficiently complementary relationship between their lowpass and highpass responses required for low distortion bandwidth stitching. Additionally, any analog circuit has significant differences unit-to-unit in production and also undergoes changes in characteristics due to temperature and aging, further distorting the summed frequency response upon band stitching.

Figure 2:
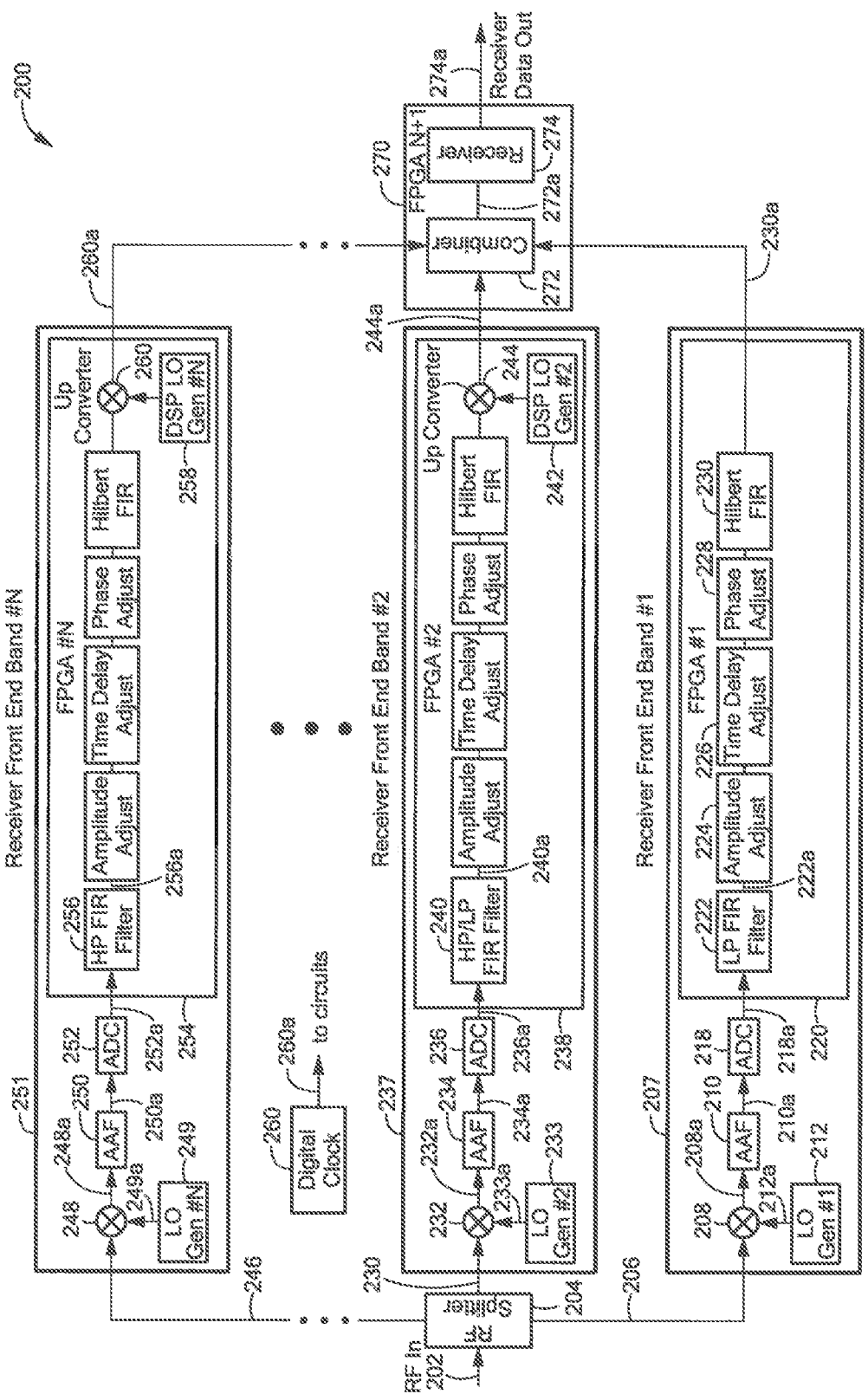
FIG. 2 is a block diagram showing a multi-band receiver for which signals from separate band circuits are stitched together, one band circuit having a digital low pass filter and an adjacent band circuit having a digital high pass filter.

Referring now to FIG. 2, an electronic circuit 200 has elements similar to those of the electronic 100 of FIG. 1. However, the electronic circuit 200 provides only a receiver function, without a transmit function. Thus, the electronic circuit 200 provides a down conversion the same as or similar to the down conversion described above in conjunction with FIG. 1, but provides a different sort of up conversion that stitches the bands together in the digital IF frequency region rather than in the RF frequency region.

An exemplary radio frequency circuit 200 for receiving an RF signal 202 includes a first band circuit 207. The first band circuit 207 includes a first down converter 208 configured to receive a signal 206 representative of the received RF signal 202 and configured to generate a first down converted signal 208a. The first band circuit 207 also includes a first antialias filter 210 coupled to receive a signal 208a representative of the first down converted signal 208a and configured to generate a first antialiased signal 210a. The first antialias filter 210 has a first upper corner frequency and a first lower corner frequency, a span between which is indicative of a first frequency band. The first band channel 207 also includes a digital low pass filter 222 coupled to receive a signal 218a representative of the first antialiased signal 210a and configured to generate a low pass filtered signal 222a within the first frequency band.

The exemplary radio frequency circuit 200 also includes a second band circuit 237 comprising a second down converter 232 configured to receive a signal 230 representative of the received RF signal 202 and configured to generate a second down converted signal 232a. The second band circuit 237 also includes a second antialias filter 234 coupled to receive a signal 232a representative of the second down converted signal 232a and configured to generate a second antialiased signal 234a. The second antialias filter 234 has a second upper corner frequency and a second lower corner frequency, a span between which is indicative of a second different frequency band. The second band circuit 237 also includes a digital high pass filter 240 coupled to receive a signal 236a representative of the second antialiased signal 234a and configured to generate a high pass filtered signal 240a within the second frequency band.

The digital low pass filter has 222 a first corner frequency proximate to the first upper corner frequency of the first antialias filter 222 and the digital high pass filter 240 has a second corner frequency proximate to the second lower corner frequency of the second antialias filter 234.

The exemplary radio frequency circuit 200 also includes a combiner 272 configured to combine a signal 230a within a frequency band representative of the first frequency band with a signal 244a within a frequency band representative of the second frequency band to generate a combined signal 272a within a wider combined frequency band having a band stitching region in which the first and second frequency bands overlap or abut. The digital low pass filter 222 and the digital high pass filter 240 have substantially complimentary phase responses selected to result in the wider combined frequency band having reduced phase response fluctuations and reduced amplitude response fluctuations in the band stitching region.

In some embodiments, an amount of overlap of the first band (associated with the first antialias filter 210) with the second band (associated with the second antialias filter 234) is selected to result in the wider combined frequency band having reduced phase response fluctuations and reduced amplitude response fluctuations in the band stitching region. In some embodiments, an amount of overlap of the first corner frequency (of the digital low pass filter 222) with the second corner frequency (of the digital high pass filter 240) is selected to result in the wider combined frequency band having reduced phase response fluctuations and reduced amplitude response fluctuations in the band stitching region.

In some embodiments, the digital low pass filter 222 and the digital high pass filter 240 are finite impulse response (FIR) digital filters.

While the above is described in conjunction with the first and second band circuits 207, 237, respectively, the same description applies to any two band circuits that have adjacent bands. To this end, the digital high pass filter 240 can be part of a digital high pass filter/digital low pass filter combination 240 (i.e., a band pass filter). With this arrangement, the combined filter 240 can form a digital low pass filter that can have a phase complimentary to a phase of a digital high pass filter in a third band, of which a digital high pass filter 256 in an Nth band circuit 251, is representative. Thus, it should be appreciated that any number of band circuits can be stitched together to form a wider band.

It should also be appreciated that, in some embodiments, the digital low pass filter 222 of the first band circuit 207 and the digital high pass filter 256 of the Nth band circuit 151 can be respective combined digital high pass filter/digital low pass filter combinations the same as or similar to the combined filter 240.

In some embodiments, the electronic circuit 200 can also include a first up converter 244 coupled between the digital high pass filter 240 and the combiner 224 to generate a first up converted signal 244a. Thus, the combiner 272 is configured to generate the combined signal 272a in accordance with the signal 230a representative of the low pass filtered signal 222a and the signal 244a representative of the first up converted signal 244a. The signals 230a, 244a are signals in an IF frequency band below the RF frequency band in which the received RF signal 202 resides.

Each band channel 207, 237, 251 can include a respective local oscillator (LO) generator 212, 233, 249, coupled to the down converters 208, 232, 248, respectively. In some embodiments, each one of the LO generators 212, 233, 249 generates different frequencies 212a, 233a, 249a, respectively. Thus, in some embodiments, the different frequencies of the LO generators 212, 233, 249 can result in the different band circuits 207, 237, 251 operating in the same frequency band, i.e., the antialias filters 210, 234, 250 can be the same. However, due to the different frequencies of the LO generators 212, 233, 249, each one of the band circuits 207, 237, 251 operates on (i.e., passes through) a different portion of the frequency spectrum of the received RF signal 202. The different portions are stitched back together by operation of the up converters 244, 260 and the combiner 272 to generate the original frequency spectrum of the received RF signal 202 but at an IF frequency band lower in frequency than the frequency band of the received RF signal 202.

The exemplary electronic circuit 200 can also include a receiver 274 coupled to receive the combined signal 272a (at IF) and configured to generate a receiver output signal 274a. The receiver 274 can have selectivity to select one or more channels (having a narrower bandwidth than a band).

With this arrangement, the combined signal 272a can reproduce the RF received signal 202 (but at respective down-converted (i.e., IF) frequencies), and can generate the combined signal 272a representative of the received RF signal 202 but at IF frequencies. In one embodiment, the electronic circuit 200 forms a radar receiver and detector for which a radar signal 202 is received, processed, detected, and classified. The processing, detection, and classification functions are not shown.

In operation, as with the circuit 100 of FIG. 1, in order to properly stitch two or more bands of the band circuits together, a signal passing through each band circuit should match in amplitude, time delay, and phase so that they can be properly added together, each frequency band adjacent to a next in frequency, at the combiner 272.

The digital low pass filter 222 and the digital high pass filter 240 can be designed to have equal (or substantially equal) time delays, and corresponding equal (or substantially equal) phase responses. It will be understood that this time delay and phase relationship can be achieved with the above-described digital low pass and digital high pass FIR filters. However, in other embodiments, the phase relationships can be other than equal, so long as the amplitude and phase responses of the filters are complementary and hence achieve the goal of band stitching with minimal distortion.

It is known that digital FIR filters have a predetermined time delay, which is equivalent to a linear phase response. This characteristic is useful when attempting to generate complementary amplitude and phase responses of channels that operate upon different frequency bands. However, in other embodiments, infinite impulse response (IIR) filters (e.g., digital IIR filters) can be used as so long as the resulting high pass and low pass filter responses are complimentary and the design is done carefully.

The substantially equal time delay responses result in a well behaved group delay for signal frequencies within the above-described band stitching region. Thus, the stitching of adjacent band circuits and signals within the adjacent band circuits can occur with reduced distortion, compared with circuits that do not have the digital low pass filter 222 and the digital high pass filter 240 with substantially complementary amplitude and phase responses.

For reasons described above in conjunction with FIG. 1, each band circuit can include an amplitude adjustment module, e.g., 224, a time delay adjustment module, e.g., 226, and a phase adjustment module, e.g., 228. These modules can be used in a calibration mode of operation to adjust amplitudes, phases, and time delays among the band circuits. Calibration is described more fully below in conjunction with FIG. 6.

Each one of the band circuits can also include an analog-to-digital converter, e.g., 218, coupled to receive a signal, e.g., 210a, from an anti-alias filter, e.g., 210.

The digital low pass filter 222, the amplitude adjustment module 224, the time delay adjustment module 226, the phase adjustment module 228, and a Hilbert filter 230 are shown to be coupled in series within a digital field programmable gate array (FPGA). However, in other embodiments, the identified elements can be within another form of digital integrated circuit, for example, a custom integrated circuit. In still other embodiments, one or more of the amplitude adjustment module 224, the time delay adjustment module 226, and the phase adjustment module 228 can be disposed at different positions within the band circuit 207. For example, in other embodiments, amplitude adjustments, time delay adjustments, or phase adjustments can be made in the analog domain to the RF input signal 202.

It should be understood that, for reasons described above in conjunction with FIG. 1, the antialias filters 210, 234, by themselves, do not provide a good means of matching the phase response of the two band circuits 207, 237

Figure 3:
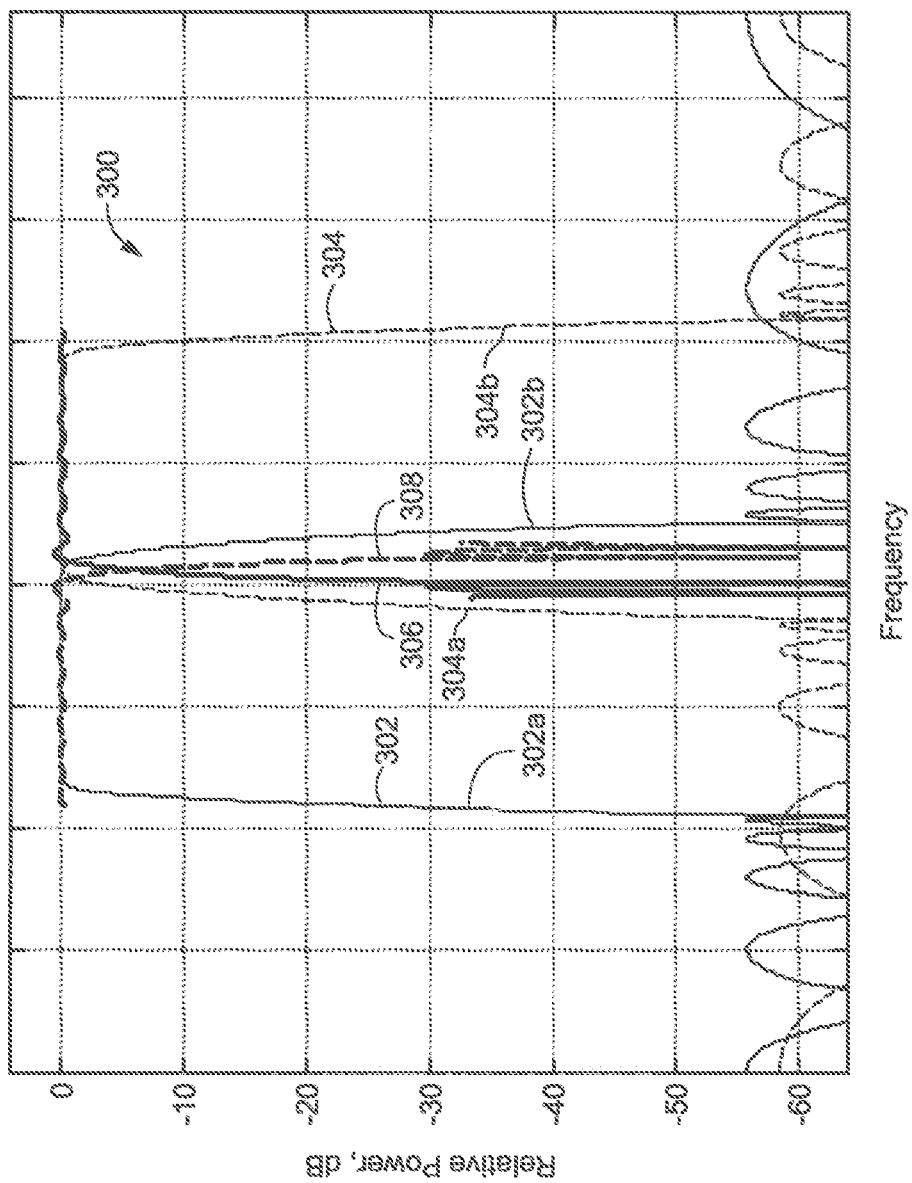
FIG. 3 is a graph showing an overlap after stitching of two frequency bands of the transceiver of FIG. 1 or the receiver of FIG. 2 corresponding to two band circuits, and also showing a high pass filter transfer function and a low pass filter transfer function of the two band circuits after stitching.

Referring now to FIG. 3, a graph 300 has a horizontal axis with a scale in units of frequency in arbitrary units and a vertical axis with a scale in units of relative power in decibels. Bands shown are indicative of bands at frequency positions representative of the combined signal 134a of FIG. 1 or the combined signal 272a of FIG. 2. As described above, the bands in the combined signal 134a of FIG. 1 reside at the RF frequencies of the received RF signal 102 of FIG. 1, but the bands of the combined signal 272a can reside at lower IF frequencies.

A first band 302 is representative of the first bands of the first antialias filters 108, 210 of FIGS. 1 and 2, respectively. The first band 302 has a lower band edge 302a and an upper band edge 302b. A second band 304 is representative of the second bands of the second antialias filters 140, 234 of FIGS. 1 and 2, respectively. The second band 304 has a lower band edge 304a and an upper band edge 304b.

From discussion above, it should be appreciated that, in some embodiments the bands 302, 304 can overlay each other before up conversion by the up converters 132, 149 of FIG. 1 and by the up converter 244 of FIG. 2. The bands are then separated by the up converters 132, 149 of FIG. 1 and by the up converter 244 of FIG. 2 and are stitched (i.e., added) together by the combiners 134, 272 of FIGS. 1 and 2, respectively. The graph 300 is representative of the bands once up converted and stitched together.

In some embodiments, the first band 302 and the second band 304 each have bandwidths of about 1 Gigahertz. However, other bandwidths and even unequal bandwidths are possible. In some embodiments of the transceiver electronic circuit 100 of FIG. 1, once up converted, the first and second bands 302, 304 of the combined signal 134a intersect at a stitching frequency region from about 20.0 to about 20.1 Gigahertz. In some embodiments of the receiver electronic circuit 200 of FIG. 2, once the second band is up converted, the first and second bands 302, 304 of the combined signal 272a intersect in a stitching frequency region from about 1.9 to about 2.0 Gigahertz. However, different stitching overlap regions are possible, including stitching overlap regions at different frequencies and with different amounts of overlap, including zero overlap.

A curve 306 is representative of a band edge and a corn frequency of the digital high pass filters 144, 240 when translated by operation of the up converters 149, 244. It should be apparent that the corner frequencies of the high pass filters 144, 240 are proximate in frequency to the lower band edge 304a of the second band 304 (i.e., of the second antialias filters 140, 234).

A curve 308 is representative of a band edge and a corner frequency of the digital low pass filter 118 when translated by operation of the up converter 132 and is representative of a band edge and corner frequency of the digital low pass filter 222, which does not undergo an up conversion. It should be apparent that the corner frequencies of the low pass filters 118, 222 are proximate in frequency to the upper band edge 302b of the first band 302 (i.e., of the first antialias filters 108, 210).

A band stitching region (i.e., crossover region) is primarily determined by the response 306 of the digital low pass filter (e.g., 118 of FIG. 1) and the response 308 of the digital high pass filter (e.g., 144 of FIG. 1). The band stitching region is more fully described below in conjunction with FIG. 4.

It will be apparent that a signal that occurs in the received RF signals 102, 202 of FIGS. 1 and 2 that has a frequency in or corresponding to the band stitching region (crossover of low pass and high pass filter responses) can undergo distortion unless the first and second above-described band channels are matched in amplitude, phase, and time delay within the band stitching region.

Figure 4:
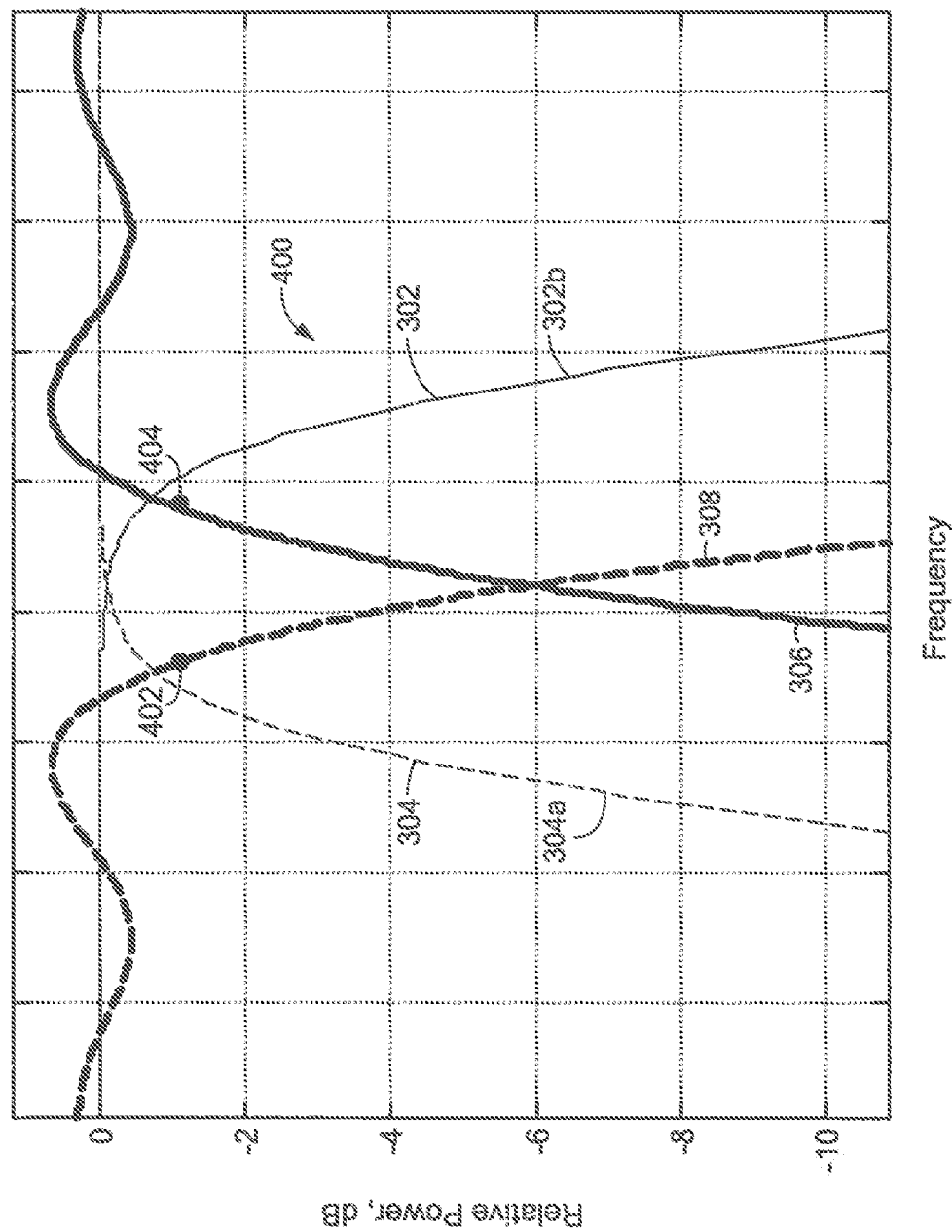
FIG. 4 is a graph showing the frequency bands and filter transfer functions of FIG. 3, but on an expanded frequency scale.

Referring now to FIG. 4, in which like element so FIG. 3 are shown having like reference designations, the bands and band edges are again shown, but in expanded form.

A definition of a frequency extent of the band stitching region is arbitrary and can be defined in a variety of ways. For example, a width (in frequency) of the band stitching region can be defined as a frequency region between points 402, 404. The point 402 can be representative of a point on the low pass filter response 308 that is one dB below an average in-band response (e.g., zero dB) of the low pass filter response 308. The point 404 can representative of a point on the high pass filter response 306 that is one dB below an average in-band response of the high pass filter response 306. However, other points on the filter responses 306, 308 can also be used to define the band stitching region. For example, points that are three dB below the average in-band responses can also be used.

Figure 5:
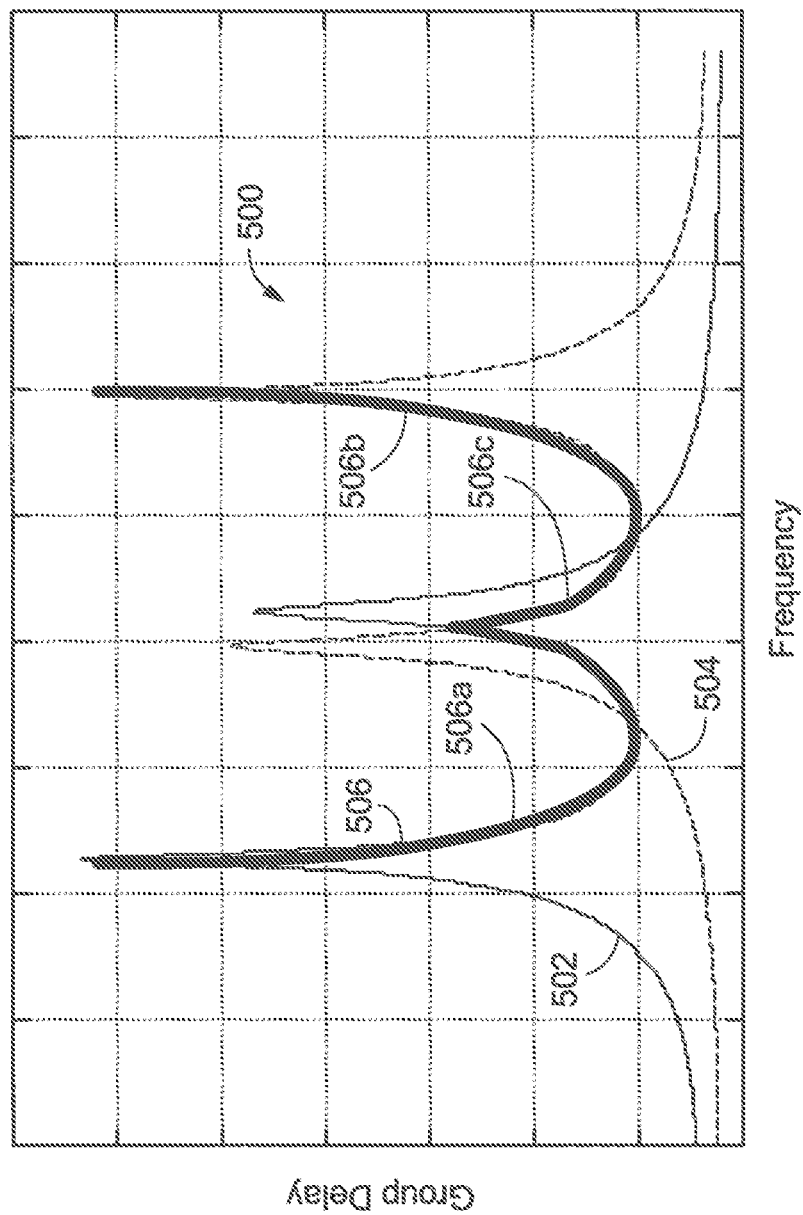
FIG. 5 is graph showing a group delay generated by two adjacent band circuits of the transceiver of FIG. 1 or the receiver of FIG. 2, showing antialias filter characteristics within the two band circuits and also showing an ideal combination of the frequency bands of the two band circuits.

Referring now to FIG. 5, a graph 500 has a horizontal axis with a scale in units of frequency in arbitrary units and a vertical axis with a scale in units of group delay in arbitrary units of time.

A curve 502 is representative of a group delay of a circuit similar to the first band circuits 105, 207 of FIGS. 1 and 2, which occupy the first band 302 of FIGS. 3 and 4 once up converted. A curve 504 is representative of a group delay of a circuit similar to the second band circuits 137, 237 of FIGS. 1 and 2, which occupy the second band 304 of FIGS. 3 and 4 once up converted. However, the curves 502, 504 are generated without having the digital low pass filters 118, 222 and without having the digital high pass filters 144, 240 of FIGS. 1 and 2, respectively. It can be seen that, for each band, the group delay increases rapidly beyond the intersection of the two bands (i.e., past the band stitching region).

A curve 506 (dark curve) depicts an ideal total group delay of the stitched bands, as is generated after the signal combiner 134 of FIG. 1 or 272 of FIG. 2. The curve 506 is generated assuming the pair of stitched bands has been aligned in amplitude, time delay, and phase. Essentially, the ideal curve 506 is synthesized by "chopping off" the high pass portion of the response of the antialias filters 108, 210 (FIGS. 1, 2, respectively), i.e., the curve 502, above the band of the digital low pass filters 118, 222, and "chopping off" the low pass portion of the response of the antialias filters 140, 234 (FIGS. 1, 2, respectively), i.e., the curve 504, below the band of the digital high pass filters (within the high pass/low pass filters 144, 240).

The curve 506 has edge regions 506a, 506b and a central region 506c. It can be seen that the group delay at the central region 506c (i.e., in the band stitching region) is substantially lower than the group delays of the curves 502, 504. This reduction in group delay in the region 506c is indicative of an overlap of the bands of the antialias filters (once up converted), and results in lower signal distortion than if the bands were to abut, as opposed to overlap.

It will be understood that the low group delay in the region 506c would be accompanied by low fluctuations in an amplitude response of the combined frequency band in the same band stitching region. The low group delay and low amplitude fluctuations correspond to low signal distortion of combined signals in the band stitching region.

Figure 5A:
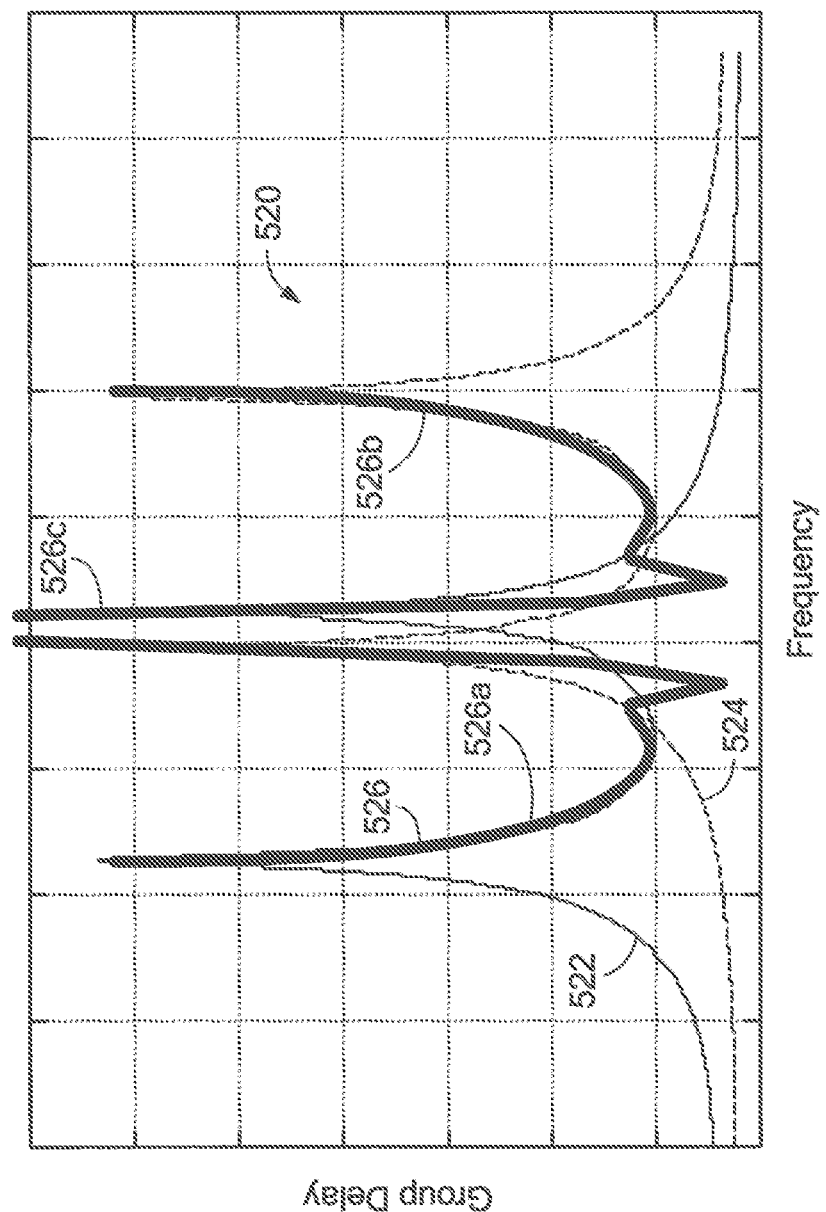
FIG. 5A is graph showing a group delay generated by two adjacent band circuits similar to those of the transceiver of FIG. 1 or the receiver of FIG. 2, showing antialias filter characteristics within the two band circuits and also showing a non-ideal combination of the frequency bands of the two band circuits, in which the digital low pass filter and the digital high pass filter of FIGS. 1 and 2 are omitted.

Referring now to FIG. 5A, a graph 520 has a horizontal axis with a scale in units of frequency in arbitrary units and a vertical axis with a scale in units of group delay in arbitrary units of time.

Curves 522, 524 are the same as the curves 502, 504 of FIG. 5, and are representative of band circuits taken separately and without the above-described digital low pass and digital low pass filters.

A curve 526 is representative of a group delay of signals similar to the combined signals 134a, 272a of FIGS. 1 and 2, respectively, and still without the above described complimentary digital low pass filters and digital high pass filters. As indicated, the group delay in a band stitching region 526c is very high. It will be understood that the high group delay would be accompanied by high fluctuations in an amplitude response in the same band stitching region. The high group delay and high amplitude fluctuations correspond to high signal distortion of combined signals in the band stitching region.

Figure 6:
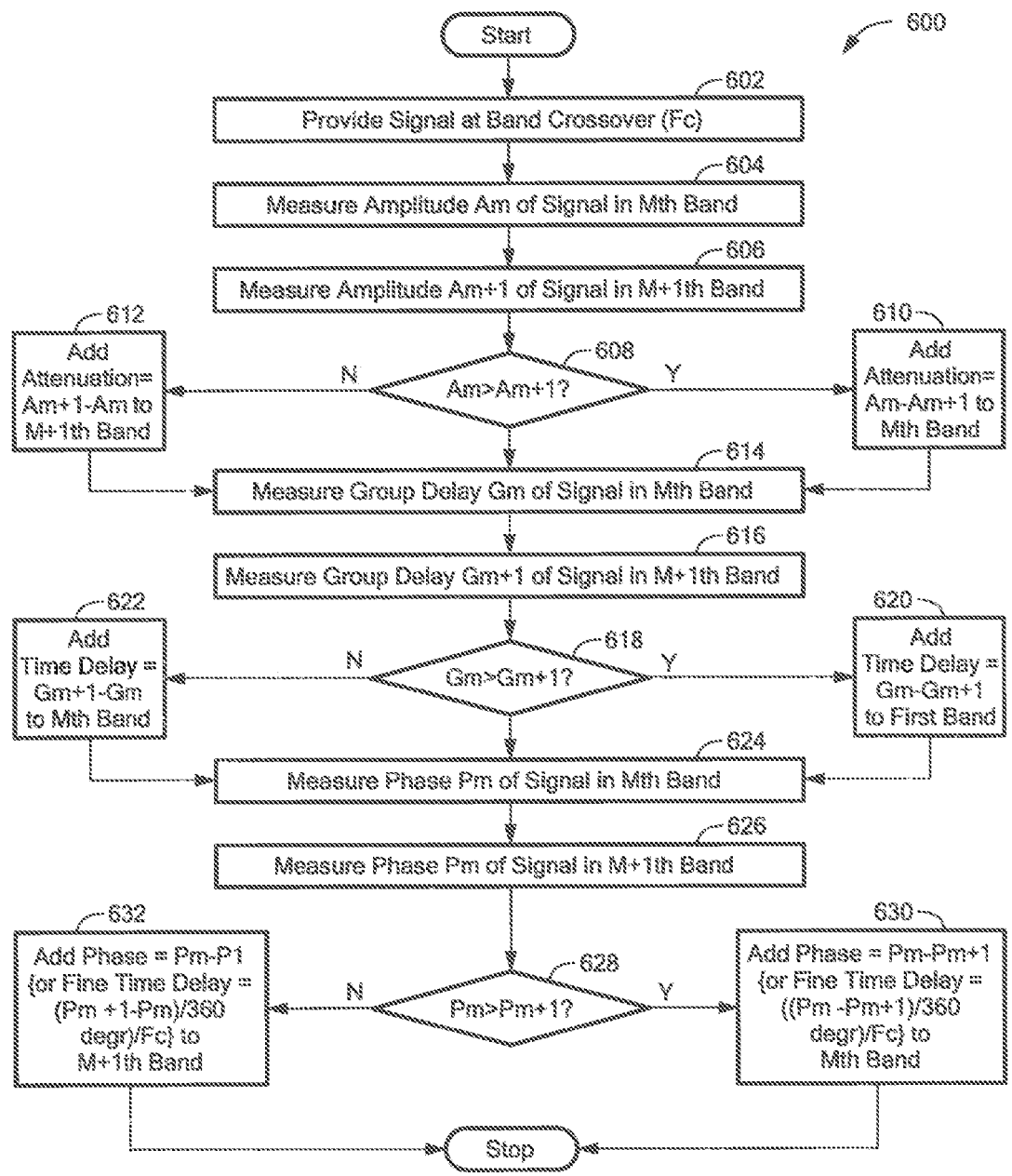
FIG. 6 is a flow chart showing a method of calibrating either the transceiver of FIG. 1 or the receiver of FIG. 2.

It should be appreciated that FIG. 6 shows a flowchart corresponding to the below contemplated technique, which would be implemented in the electronic circuits 100, 200 of FIGS. 1 and 2. Rectangular elements (typified by element 602 in FIG. 6), herein denoted "processing blocks," represent computer software instructions or groups of instructions. Diamond shaped elements (typified by element 622 in FIG. 6), herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when in possible, the steps can be performed in any convenient or desirable order.

Referring now to FIG. 6, a method 600 depicts an alignment adjustments performed in individual band circuits that enables a successful combination (i.e., stitching) of adjacent bands. At block 602, a signal is injected at a band crossover frequency. At blocks 604 and 606, a signal amplitude is measured in each band circuit. At blocks 608, 610, 612, amplitudes in the two band circuits are equalized. At blocks 614 and 616, a group delay is measured in each band circuit. At blocks 618, 620, 622, the group delay in the two band circuits are equalized, which can be accomplished by retarding an integer number of samples in a selected one of the two band circuits. At blocks 624 and 626, a phase is measured in each band circuit. The phase can be considered to be a fine delay. At blocks 628, 630, 632 the phase in the two band circuits is equalized, which can be accomplished with a phase shift circuit. An exemplary digital phase shift circuit is described below in conjunction with FIG. 7. However, in some embodiments, the phase shift circuit can alternatively be implemented with an analog circuit.

In particular, at block 602, signal is provided to the electronic circuit, for example, the electronic circuit 100 of FIG. 1 or the electronic circuit 200 of FIG. 2. The provided signal can be indicative of the input signal 102 of FIG. 1 or the input signal 202 of FIG. 2. For example, the input signal can be an RF chirp signal spanning the bands of interest.

At block 604, an amplitude of the signal in a first band circuit, for example, within the first band circuit 105 of FIG. 1, is measured.

At block 606, an amplitude of the signal in a second band circuit, for example, within the second band circuit 137 of FIG. 1, is measured.

At block 608, amplitudes of the signal in the two band circuits are compared. If the amplitude of the signal in the first band circuit is larger than the amplitude of the signal in the second band circuit, then the process continues to block 610.

At block 610, attenuation is added to the first band circuit, for example, by way of the amplitude adjustment module 120 of FIG. 1. Attenuation can be added, for example, in the digital domain by bit shifting or by multiplying.

At block 608, if the amplitude of the signal in the first band circuit is not larger than the amplitude of the signal in the second band circuit, then the process continues to block 612.

At block 612, attenuation is added to the second band circuit.

At block 614, a group delay of the signal in the first band circuit is measured.

At block 616, a group delay of the signal in the second band circuit is measured.

At block 618, group delays of the signal in the two band circuits are compared. If the group delay of the signal in the first band circuit is larger than the group delay of the signal in the second band circuit, then the process continues to block 620.

At block 620, a time delay is added to the first band circuit, for example, by way of the time delay adjustment module 122 of FIG. 1. It will be understood that a time delay can be added to a channel by introducing a gate delay or a register delay synchronous with a clock signal.

At block 618, if the group delay of the signal in the first band circuit is not larger than the group delay of the signal in the second band circuit, then the process continues to block 622.

At block 622, a time delay is added to the second band circuit.

At block 624, a phase of the signal in the first band circuit is measured.

At block 626, a phase of the signal in the second band circuit is measured.

At block 628, phases of the signal in the two band circuits are compared. If the phase of the signal in the first band circuit is larger (i.e., has more phase) than the phase of the signal in the second band circuit, then the process continues to block 630.

At block 630, phase is added to the first band circuit, for example, by way of the phase adjustment module 124 of FIG. 1. Phase can be added in a number of ways. An exemplary circuit that can add phase to a band circuit is described below in conjunction with FIG. 7.

At block 628, if the phase of the signal in the first band circuit is not larger than the phase of the signal and the second band circuit, then the process continues to block 632.

At block 632, phases added to the second band circuit.

Figure 7:
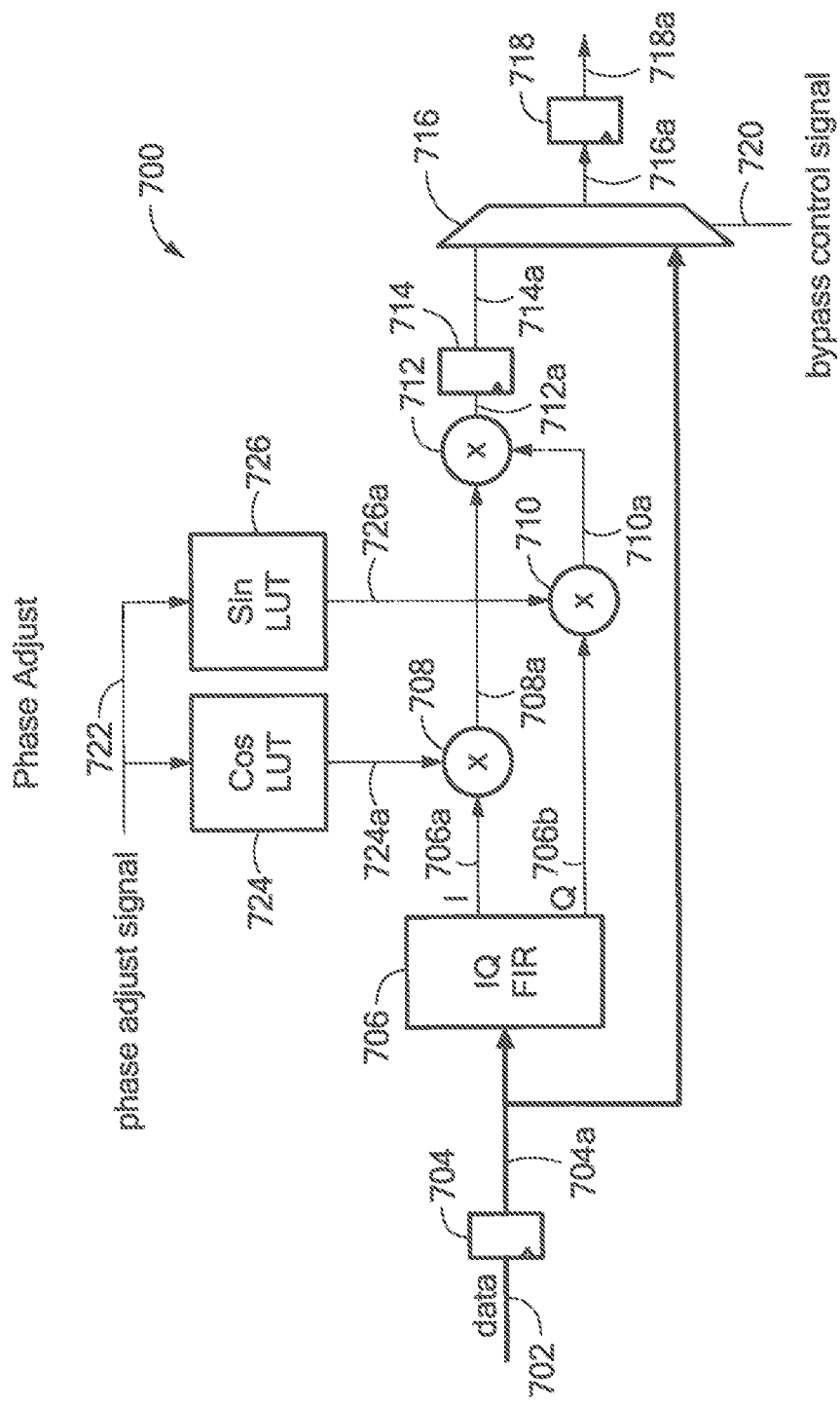
FIG. 7 is a block diagram of an exemplary phase adjustment circuit that can be used within the transceiver and receiver of FIGS. 1 and 2.

Referring now to FIG. 7, an exemplary phase adjustment module 700 can be the same as or similar to any of the above-described phase adjustment modules. The exemplary phase adjustment module 700 is in the form of a digital vector modulator. Note that a vector modulator can be implemented either in digital form or in analog form.

The phase adjustment module 700 can include a buffer register 704 coupled to receive a digital data signal 702 and configured to generate buffered data 704a. An IQ module, for example, an IQ finite impulse response (FIR) digital circuit, can be coupled to receive the buffered data 704a and configured to generate an I signal and a Q signal, which are ninety degrees apart from each other, regardless of frequency.

A first multiplier 708 can be coupled to receive the I signal 706a, and a second multiplier 710 can be coupled to receive the Q signal 706b. The first multiplier 708 can also be coupled to receive a first multiplier signal 724a. The second multiplier 710 can also be coupled to receive a second multiplier signal 726a. The first multiplier 708 is configured to generate a multiplied signal 708a as a product of the I signal 706a and the first multiplier signal 724a. The second multiplier 710 is configured to generate a multiplied signal 710a as a product of the Q signal 706b and the second multiplier signal 726a.

A summing module 712 is coupled to receive the first and second multiplied signals 708a, 710a and configured to provide a summed signal 712a as a sum of the two input signals. The resultant summed signal 712 is a phase shifted version of the input signal 704a, adjusted in accordance with a value of a phase adjust signal 722.

A buffer register 714 can be coupled to receive the summed signal 712a and configured to generate another buffered signal 714a.

A multiplexer 716 can be coupled to receive the buffered signal 714a and coupled to receive the buffered signal 704a. By way of a bypass control signal 720, the multiplexer 716 can select as an output signal 716a either the buffered signal 714a, which includes a phase adjustment, or the buffered signal 704a, which does not include a phase adjustment.

Another buffer register 718 can be coupled to receive the output signal 716a and configured to generate yet another buffered signal 718a.

In operation, at the summing module 712, the phase adjustment module 700 is configured to add together different amounts of the I signal and the Q signal depending upon the multiplier signals (i.e., factors) 724a, 726a. The multiplier signals 724a, 726a can be selected from a plurality of multiplier signals stored within a cosine lookup table (LUT) 724 and a sine lookup table 726. The selection is made by way of a phase adjustment signal 722.

All references cited herein are hereby incorporated herein by reference in their entirety.

Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. An electronic circuit for receiving and processing a signal, comprising:
   a first band circuit comprising:
      a first down converter configured to receive a signal representative of the received signal and configured to generate a first down converted signal;
      a first antialias filter coupled to receive a signal representative of the first down converted signal and configured to generate a first antialiased signal, the first antialias filter having a first upper corner frequency and a first lower corner frequency, a span between which is indicative of a first frequency band; and
      a digital low pass filter coupled to receive a signal representative of the first antialiased signal and configured to generate a low pass filtered signal within the first frequency band;
   a second band circuit comprising:
      a second down converter configured to receive a signal representative of the received signal and configured to generate a second down converted signal;
      a second antialias filter coupled to receive a signal representative of the second down converted signal and configured to generate a second antialiased signal, the second antialias filter having a second upper corner frequency and a second lower corner frequency, a span between which is indicative of a second different frequency band; and a digital high pass filter coupled to receive a signal representative of the second antialiased signal and configured to generate a high pass filtered signal within the second frequency band, wherein the digital low pass filter comprises a first corner frequency proximate to the first upper corner frequency of the first antialias filter, wherein the digital high pass filter comprises a second corner frequency proximate to the second lower corner frequency of the second antialias filter, wherein a frequency of the first corner frequency of the digital low pass filter is selected to result in a substantial reduction of a changing effect due to a changing characteristic of a low pass rolloff portion of the first antialias filter, and wherein a frequency of the second corner frequency of the digital high pass filter is selected to result in a substantial reduction of a changing effect due to a changing characteristic of a high pass portion of the second antialias filter, wherein the frequency of the first corner frequency of the digital low pass filter is below a frequency of the first upper corner frequency of the first antialias filter, and wherein the frequency of the second corner frequency of the digital high pass filter is above a frequency of the second lower corner frequency of the second antialias filter, wherein at least one of the first band circuit or the second band circuit further comprises an up converter coupled to receive a signal representative of the low pass filtered signal or a signal representative of the high pass filtered signal, respectively, and wherein the up converter is configured to generate an up converted signal; wherein the electronic circuit further comprises:

a combiner configured to combine a signal within a frequency band representative of the first frequency band with a signal within a frequency band representative of the second frequency band to generate a combined signal within a wider combined frequency band wider than the first frequency band and wider than the second frequency band, the wider combined frequency band having a band stitching region in which the first and second frequency bands overlap, wherein the digital low pass filter and the digital high pass filter have substantially complimentary phase responses selected to result in the wider combined frequency band having reduced phase response fluctuations and reduced amplitude response fluctuations in the band stitching region.

2. The electronic circuit of claim 1, wherein an amount of overlap of the first band with the second hand is selected to result in the wider combined frequency band having reduced phase response fluctuations and reduced amplitude response fluctuations in the band stitching region; and an amount of overlap of the first corner frequency with the second corner frequency is selected to result in the wider combined frequency band having reduced phase response fluctuations and reduced amplitude response fluctuations in the band stitching region.

3. The electronic circuit of claim 2, wherein the digital low pass filter and the digital high pass filter comprise respective finite impulse response filters.

4. The electronic circuit of claim 3, wherein amplitude and phase responses of the digital low pass filter and of the digital high pass filter are selected to reduce a distortion of the combined signal when the low pass filtered signal and the high pass filtered signal have frequencies in the band stitching frequency region.

5. The electronic circuit of claim 3, wherein the first band circuit further comprises a first amplitude adjustment module configured to receive a first amplitude adjustment control signal and configured to apply a first amplitude adjustment to the first band circuit, and wherein the second band circuit further comprises a second amplitude adjustment module configured to receive a second amplitude adjustment control signal and configured to apply a second amplitude adjustment to the second band circuit.

6. The electronic circuit of claim 3, wherein the first band circuit further comprises a first time delay adjustment module configured to receive a first time delay adjustment control signal and configured to apply a first time delay adjustment to the first band circuit, and wherein the second band circuit further comprises a second time delay adjustment module configured to receive a second time delay adjustment control signal and configured to apply a second time delay adjustment to the second band circuit.

7. The electronic circuit of claim 3, wherein the first band circuit further comprises a first phase adjustment module configured to receive a first phase adjustment control signal and configured to apply a first phase adjustment to the first band circuit, and wherein the second band circuit further comprises a second phase adjustment module configured to receive a second phase adjustment control signal and configured to apply a second phase adjustment to the second band circuit.

8. The electronic circuit of claim 3, further comprising:
a receiver/exciter coupled to receive a signal representative of the low pass filtered signal and configured to generate a first transmission signal in accordance with low pass filtered signal;
a second waveform processor coupled to receive a signal representative of the high pass filtered signal and configured to generate a second transmission signal in accordance with high pass filtered signal, wherein the a combiner is coupled to receive a signal representative of first transmission signal and a signal representative of the second transmission signal and configured to generate the combined signal in accordance with the signal representative of the first transmission signal and the signal representative of the second transmission signal.

9. The electronic circuit of claim 8, further comprising:
a first up converter coupled between the first waveform processor and the combiner to generate a first up converted signal; and
a second up converter coupled between the second waveform processor and the combiner to generate a second up converted signal, wherein the combiner is configured to generate the combined signal in accordance with a signal representative of the first up converted signal and a signal representative of the second up converted signal.

10. The electronic circuit of claim 9, wherein the electronic circuit further comprises an RF transmitter module coupled to receive the combined signal and configured to modify the combined signal and to transmit an RF signal representative of the modified combined signal.

11. The electronic circuit of claim 10, wherein the transmitted RF signal comprises a radar jamming signal.

12. The electronic circuit of claim 9, wherein amplitude and phase responses of the digital low pass filter and of the digital high pass filter are selected to reduce a group delay of the combined signal when the received signal has a frequency in the band stitching frequency region.

13. The electronic circuit of claim 9, wherein the first band circuit further comprises a first amplitude adjustment module configured to receive a first amplitude adjustment control signal and configured to apply a first amplitude adjustment to the first band circuit, and wherein the second band circuit further comprises a second amplitude adjustment module configured to receive a second amplitude adjustment control signal and configured to apply a second amplitude adjustment to the second band circuit.

14. The electronic circuit of claim 9, wherein the first band circuit further comprises a first time delay adjustment module configured to receive a first time delay adjustment control signal and configured to apply a first time delay adjustment to the first band circuit, and wherein the second band circuit further comprises a second time delay adjustment module configured to receive a second time delay adjustment control signal and configured to apply a second time delay adjustment to the second band circuit.

15. The electronic circuit of claim 9, wherein the first band circuit further comprises a first phase adjustment module configured to receive a first phase adjustment control signal and configured to apply a first phase adjustment to the first band circuit, and wherein the second band circuit further comprises a second phase adjustment module configured to receive a second phase adjustment control signal and configured to apply a second phase adjustment to the second band circuit.

16. The electronic circuit of claim 1, further comprising:
calibration means configured to inject an electronic signal into the first band circuit and into the second band circuit, and using the injected electronic signal, configured to measure a first amplitude, a first group delay, and a first phase of the first band circuit, and configured to measure a second amplitude, a second group delay, and a second phase of the second hand circuit;
first adjustment means configured to adjust the first amplitude and the second amplitude to be substantially equal;
second adjustment means configured to adjust the first group delay and the second group delay to be substantially equal; and
third adjustment means configured to adjust the first phase and the second phase to be substantially equal.

17. The electronic circuit of claim 16, wherein the injected electronic signal injected by the calibration means comprises an injected chirp signal that changes frequency from a minimum frequency to a maximum frequency, wherein the minimum frequency and the maximum frequency are selected to result in a signal representative of the injected chirp signal appearing in the band-stitching region.

18. A method used in an electronic circuit, the electronic circuit for receiving and processing a signal, the method comprising:
in a first band circuit:
down converting a signal representative of the received signal to generate a first down converted signal;
filtering a signal representative of the first down converted signal with a first antialias filter to generate a first antialiased signal, the first antialias filter having a first upper corner frequency and a first lower corner frequency, a span between which is indicative of a first frequency band; and
low pass filtering, with a digital low pass filter, a signal representative of the first antialiased signal to generate a low pass filtered signal within the first frequency band;
in a second band circuit:
down converting a signal representative of the received signal to generate a second down converted signal;
filtering a signal representative of the second down converted signal with a second antialias filter to generate a second antialiased signal, the second antialias filter having a second upper corner frequency and a second lower corner frequency, a span between which is indicative of a second different frequency band; and
high pass filtering, with a digital high pass filter, a signal representative of the second antialiased signal to generate a high pass filtered signal within the second frequency band, wherein the digital low pass filter comprises a first corner frequency proximate to the first upper corner frequency of the first antialias filter, and wherein the digital high pass filter comprises a second corner frequency proximate to the second lower corner frequency of the second antialias filter,
wherein a frequency of the first corner frequency of the digital low pass filter is selected to result in a substantial reduction of a changing effect due to a changing characteristic of a low pass rolloff portion of the first antialias filter, and wherein a frequency of the second corner frequency of the digital high pass filter is selected to result in a substantial reduction of a changing effect due to a changing characteristic of a high pass portion of the second antialias filter,
wherein the frequency of the first corner frequency of the digital low pass filter is below a frequency of the first upper corner frequency of the first antialias filter, and wherein the frequency of the second corner frequency of the digital high pass filter is above a frequency of the second lower corner frequency of the second antialias filter, wherein the method further comprises:
frequency shifting to a higher frequency at least one of the first frequency band or the second frequency band; and
combining a signal within a frequency band representative of the first frequency band with a signal within a frequency band representative of the second frequency band to generate a combined signal within a wider combined frequency band wider than the first frequency band and wider than the second frequency band, the wider combined frequency band having a band stitching region in which the first and second frequency bands overlap, wherein the digital low pass filter and the digital high pass filter have substantially complimentary phase responses selected to result in the wider combined frequency band having reduced phase response fluctuations and reduced amplitude response fluctuations in the band stitching region.

19. The method of claim 18, further comprising
selecting an amount of overlap of the first hand with the second band to result in the wider combined frequency band having reduced phase response fluctuations and reduced amplitude response fluctuations in the band stitching region; and
selecting an amount of overlap of the first corner frequency with the second corner frequency to result in the wider combined frequency band having reduced phase response fluctuations and reduced amplitude response fluctuations in the band stitching region.

20. The method of claim 19, wherein the digital high pass filter and the digital low pass filter comprise respective finite impulse response filters.

21. The method of claim 20, further comprising at least one of:
calibrating a relative amplitude of the first band circuit and of the second band circuit when the low pass filtered signal and the high pass filtered signal have frequencies within the band stitching frequency region;
calibrating a relative time delay of the first band circuit and the second band circuit and the second band circuit when the low pass filtered signal and the high pass filtered signal have frequencies within the band stitching frequency region; or
calibrating a relative phase of the first band circuit and the second band circuit and the second band circuit when the low pass filtered signal and the high pass filtered signal have frequencies within the band stitching frequency region.

22. The method of claim 21, wherein the calibrating the relative time delay comprises:
measuring a group delay of a signal representative of the low pass filtered signal to generate a first group delay measurement;
measuring a group delay of a signal representative of the high pass filtered signal to generate a second group delay measurement; and
comparing the first and second group delay measurements; and
adjusting a time delay of the first band channel or the second band channel in accordance with the comparison.

23. The method of claim 21, wherein the calibrating the relative phase comprises:
measuring a phase of a signal representative of the low pass filtered signal to generate a first phase measurement;
measuring a phase of a signal representative of the high pass filtered signal to generate a second phase measurement; and
comparing the first and second phase measurements; and
adjusting a time delay of the first band channel or the second band channel in accordance with the comparison.

24. The method of claim 20, further comprising:
processing a signal representative of the low pass filtered signal to generate a first transmission signal;
processing a signal representative of the high pass filtered signal to generate a second transmission signal, wherein the combining comprises combining a signal representative of the first transmission signal with a signal representative of the second transmission signal to generate the combined signal.

25. The method of claim 24, further comprising:
in the first band circuit, up converting a signal representative of the low pass filtered signal to generate a first up converted signal; and
in the second band circuit, up converting a signal representative of the high pass filtered signal to generate a second up converted signal, wherein the combining comprises combining a signal representative of the first up converted signal with a signal representative of the second up converted signal to generate the combined signal.

26. The method of claim 24, further comprising:
modifying the combined signal; and
transmitting the modified combined signal with a radio transmitter.

27. The method of claim 24, further comprising at least one of:
calibrating a relative amplitude of the first band circuit and the second band circuit when the low pass filtered signal and the high pass filtered signal have frequencies within the band stitching frequency region;
calibrating a relative time delay of the first band circuit and the second band circuit and the second band circuit when the low pass filtered signal and the high pass filtered signal have frequencies within the band stitching frequency region; or
calibrating a relative phase of the first band circuit and the second band circuit and the second band circuit when the low pass filtered signal and the high pass filtered signal have frequencies within the band stitching frequency region.

28. The method of claim 27, wherein the calibrating the relative time delay comprises:
measuring a group delay of a signal representative of the low pass filtered signal to generate a first group delay measurement;
measuring a group delay of a signal representative of the high pass filtered signal to generate a second group delay measurement; and
comparing the first and second group delay measurements; and
adjusting a time delay of the first hand channel or the second band channel in accordance with the comparison.

29. The method of claim 27, wherein the calibrating the relative phase comprises:
measuring a phase of a signal representative of the low pass filtered signal to generate a first phase measurement;
measuring a phase of a signal representative of the high pass filtered signal to generate a second phase measurement; and
comparing the first and second phase measurements; and
adjusting a time delay of the first band channel or the second band channel in accordance with the comparison.

30. The method of claim 18, further comprising:
injecting an electronic signal into the first band circuit and into the second band circuit,
measuring a first amplitude, a first group delay, and a first phase of the first band circuit using the injected electronic signal;
measuring a second amplitude, a second group delay, and a second phase of the second band circuit using the injected electronic signal;
adjusting the first amplitude and the second amplitude to be substantially equal;
adjusting the first group delay and the second group delay to be substantially equal; and
adjusting the first phase and the second phase to be substantially equal.

31. The method of claim 30, wherein injecting the electronic signal into the first band circuit and into the second band circuit comprises injecting an injected chirp signal that changes frequency from a minimum frequency to a maximum frequency, wherein the minimum frequency and the maximum frequency are selected to result in a signal representative of the injected chirp signal appearing in the hand-stitching region.

* * * * *